United States Patent [19]

Nagasawa et al.

[11] 3,786,191

[45] Jan. 15, 1974

[54] AUTOMATIC TELEPHONE ANSWERING DEVICE WITH SIMULTANEOUS MESSAGE RECEPTION AND TRANSMISSION

[75] Inventors: Toshifumi Nagasawa, Tokyo; Haruhiko Ohshima, Kawasaki, both of Japan

[73] Assignee: Pioneer Electronics Corporation, Tokyo, Japan

[22] Filed: Mar. 28, 1972

[21] Appl. No.: 238,902

[30] Foreign Application Priority Data

Apr. 2, 1971 Japan .............................. 46/20162

[52] U.S. Cl. .......................... 179/6 R, 179/100.2 K

[51] Int. Cl. ............................................ H04m 1/64

[58] Field of Search ................. 179/6 R, 6 AC, 6 C, 179/6 E, 100.2 K, 100.2 MD, 100.3 B

[56] References Cited

UNITED STATES PATENTS

| | | | |
|---|---|---|---|
| 3,728,487 | 4/1973 | Hata | 179/6 R |
| 3,197,574 | 7/1965 | Zane | 179/100.2 K |
| 3,492,427 | 1/1970 | Foster | 179/6 AC |
| 2,773,124 | 12/1956 | Handschin | 179/6 E |
| 3,204,047 | 8/1965 | Trost | 179/100.2 K |

*Primary Examiner*—Raymond F. Cardillo, Jr.
*Attorney*—Richard C. Sughrue et al.

[57] ABSTRACT

An automatic telephone answering device wherein a message recording tape is started to run simultaneously with the start of running of an answering tape having an answer signal recorded thereon. The message recording tape is recorded on its first track with only the answer signal and on its second track with a composite signal consisting of the answer signal and the incoming message signal. At the time of reproduction, the answer signal on the first track of the recording tape is phase-inverted and the composite signal reproduced from the second track of the recording tape is mixed with the phase-inverted answer signal to cancel the answer signal, whereby only the message signal is audibly reproduced by a speaker.

5 Claims, 1 Drawing Figure

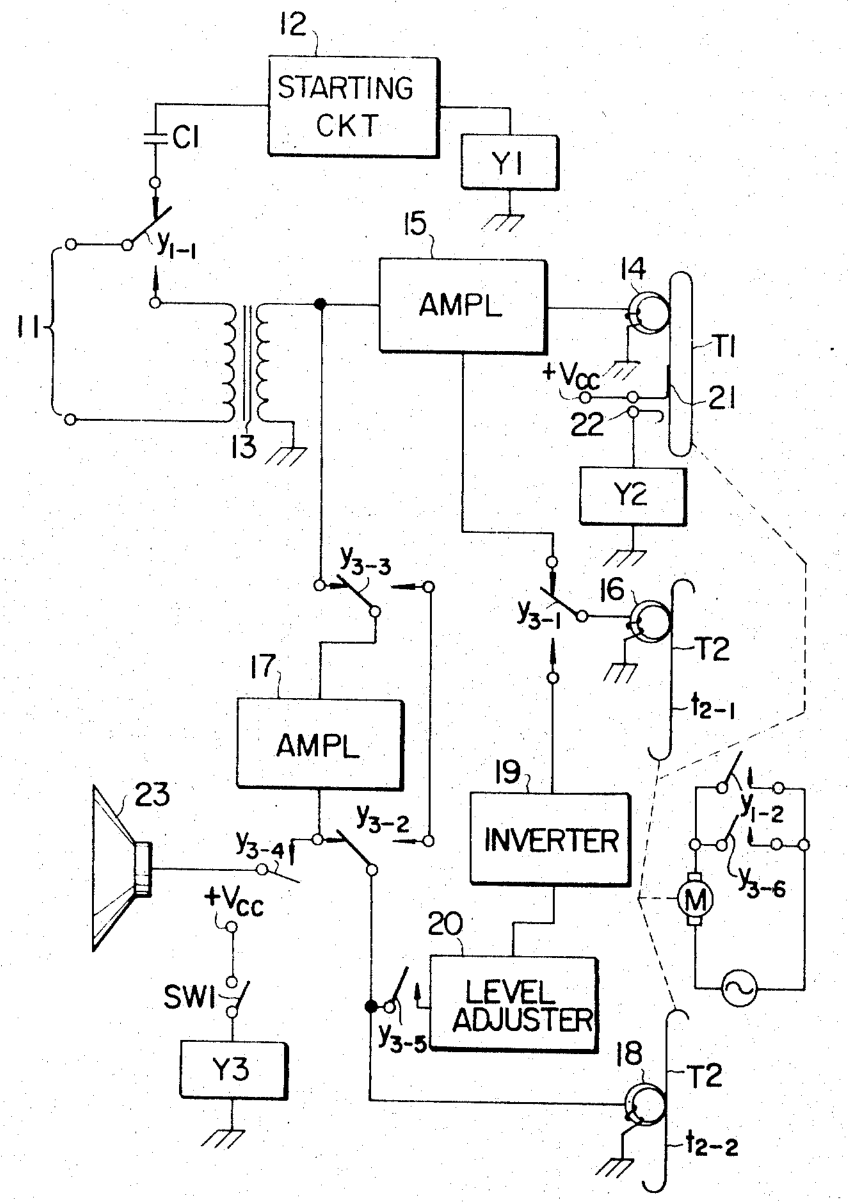
12
STARTING CKT
C1
Y1
$y_{1-1}$
11
13
15
AMPL
14
T1
+Vcc
21
22
Y2
$y_{3-3}$
$y_{3-1}$
16
T2
$t_{2-1}$
17
AMPL
19
INVERTER
23
$y_{3-4}$
$y_{3-2}$
+Vcc
SW1
Y3
20
LEVEL ADJUSTER
$y_{3-5}$
$y_{1-2}$
$y_{3-6}$
M
18
T2
$t_{2-2}$

AUTOMATIC TELEPHONE ANSWERING DEVICE WITH SIMULTANEOUS MESSAGE RECEPTION AND TRANSMISSION

BACKGROUND OF THE INVENTION

1. Field of the Invention

This invention relates to an automatic telephone answering device and, more particularly, to such a device which records a message from a caller at the time of reproducing and transmitting an answer signal or message, and thereafter permits its owner to hear only the recorded message from the caller.

2. Description of the Prior Art

In conventional automatic telephone answering devices, the following first and second systems have mainly been employed to record a message from a caller:

The first system is characterized in that a mechanism is energized in response to a call signal generated from a caller to drive an answering tape of the endless type and having recorded thereon an answer signal or message, when the whole answer signal is reproduced and a conductive foil bonded on the answering tape is detected, the running of the answering tape is stopped and, without interruption, a recording tape is run to record a message from the caller.

The second system includes the same means for running an answering tape; however, it differs from the first system in that when the whole answer message is reproduced, in response to detection of an end-of-answer message signal recorded on the answering tape, the running of the answering tape is stopped and, without interruption, a recording tape is run.

The foregoing first and second systems of the prior art have several drawbacks. That is, in case a caller is unfamiliar with such systems, one, who is not aware of the fact that a reply is being given by an automatic telephone answering device, speaks while the reproduction of the answer message recorded on the answering tape is taking place. Then, he is puzzled, and puts down the handset. Hence, any word that the caller spoke is not recorded on the recording tape, and it is not clear who the caller is, so that it is impossible later for the owner of the answering device to determine what was said by the caller. All the owner knows is the fact than an incoming call had been received.

Further, in the case of a caller familiar with such devices, even if the caller has initially perceived the contents of the answer message, it is impossible for him, in accordance with the foregoing first system, to cause the recording of his incoming message until after the whole answer message has been transmitted and the conductive foil of the answering tape has been detected; and, according to the second system, it is impossible to cause recording of an incoming message except after the whole answer message has been transmitted. As a consequence, the prior art devices had the drawbacks that wasted time elapsed until the running of the answering tape terminated, and also that a fee for unnecessary conversation is calculated.

SUMMARY OF THE INVENTION

The present invention has been developed for the purpose of settling the foregoing inconveniences. That is, in response to a call signal from a caller an answering tape and a recording tape are concurrently caused to run, an answer signal is reproduced from the running answering tape and transmitted to the caller, and, at the same time, the answer signal is recorded on a first track of the recording tape. Furthermore, simultaneously with recording to the answer signal, the incoming message signal provided by the caller is combined with a part of the answer signal reproduced from the answering tape and is recorded on a second track of the recording tape.

Then, when it is desired to reproduce the incoming message from the caller, the answer signal recorded on the first track of the recording tape is reproduced and phase-inverted by means of a phase-inverter circuit, the level of this phase-inverted answer signal is selected so as to correspond to the output level of the answer signal reproduced from the second track of the recording tape which is treated as a reference output, and both of these signals are combined to cancel out the answer signal. As a result, only the message signal recorded on the second track of the recording tape is audibly reproduced by an associated speaker.

Accordingly, it is a first object of the present invention to provide an automatic telephone answering device in which a recording tape is run simultaneously with the running of an answering tape, a message from a caller is recorded even while the answering tape is running for reproduction, and thereby the incoming message from the caller is recorded simultaneously with the reproduction of the answer signal and the transmission thereof.

It is a second object of the present invention to provide a simple, accurate and reliable automatic telephone answering device which is devoid of the tape drive switching mechanism which was generally employed in the prior art to cause running of a recording tape after the termination of the running of an answering tape and, thus, is free from possible malfunctioning of the same.

BRIEF DESCRIPTION OF THE DRAWING

The single FIGURE is a combined block and schematic diagram of a preferred embodiment of the invention.

DESCRIPTION OF THE PREFERRED EMBODIMENT

In the drawing, upon the receipt of an incoming call signal, such as a bell signal, at the connection terminals 11 of a telephone line, that signal is conducted through the closed upper contact of a pair of contacts *y1–1* of a relay Y1 and through a coupling capacitor C1 to a starting circuit 12. The relay Y1 operates after a three to ten second delay to change over its contacts *y1–1* and *y1–2,* so that the telephone line and terminals 11 are connected via the closed lower contact of contacts *y1–1* across a transformer 13. The contacts *y1–2* are also closed to close a motor circuit which causes a motor M to rotate, thereby causing an answering tape T1 and a recording tape T2 simultaneously to start to run.

An answer signal previously recorded on the closed loop answering tape T1 is reproduced by a magnetic head 14 and amplified by an amplifier 15. The amplified answer signal is sent out to the caller through the transformer 13 and the telephone line connection terminals 11. The amplified answer signal is also conducted through the closed upper contact of a pair of relay contacts *y3–1* to a magnetic record/reproduce head 16 which records the answer signal on a first track *t*2–1 of the recording tape T2. The amplified answer signal also passes through the closed left-hand contact of a pair of relay contacts *y*3–3 to an amplifier 17 where it is amplified and, after passing through the closed left-hand contact of a pair of relay contacts *y*3–2, is recorded by means of a magnetic record/reproduce head 18 on a second track *t'*–2 of the recording tape T2.

Simultaneously with the transmission of the answer signal as described above, a message signal provided by the caller passes through the telephone line connection terminals 11, the transformer 13, and the closed relay contact *y*3–3, to amplifier 17 where it is amplified together with the answer signal and then passed through the closed relay contact y3–2 also to be recorded (along with the answer signal) by the magnetic head 18 on the second track *t*2–2 of the recording tape T2.

In the course of operation, when the answering tape T1 has completed transmission of the whole answer signal through one run, because that tape is of the closed loop or endless type, at the end of one revolution of the tape, a conductive foil 21 bonded on the tape short-circuits electrodes 22 to thereby energize a relay coil Y2. Upon the energization of the relay coil Y2, a portion of a drive transfer or clutch mechanism (not shown) which transmits rotary motion from the motor M to a capstan (not shown), a reel shaft, and the like is released to terminate running of the answering tape T1 irrespective of the running of the recording tape T2.

As a result of the afore-mentioned answering operation, the answer signal has been recorded on the first track *t*2–1 of the recording tape T2, and a composite signal consisting of the answer signal and message signal has been recorded on the second track *t*2–2.

To effect reproduction, a switch SW1 is closed whereby a relay coil Y3 is actuated to change over its contacts *y*3–1, *y*3–2, *y*3–3, *y*3–4, *y*3–5, and *y*3–6 to positions opposite from those illustrated in the drawing. The motor circuit is thereby closed by the closed contact *y*3–6 to energize the motor M, so that the recording tape T2 begins to run. The composite signal consisting of the answer signal and message signal recorded on the second track *t*2–2 of the recording tape T2 is reproduced by the magnetic head 18, while the answer signal recorded on the first track *t*2–1 of the recording tape T2 is reproduced concurrently by the magnetic head 16. The answer signal reproduced from the first track *t*2–1 is conducted through relay contact *y*3–1 to a phase-inverter circuit 19 where it is phase-inverted. The phase-inverted answer signal is adjusted by a level adjuster circuit 20 such as variable resistance, so as to have the same level as that of the answer signal output reproduced from the second track which output is taken as a reference output. The phase-inverted, level-adjusted answer signal is sent through the closed relay contact *y*3–5 and combined with the answer signal reproduced from the second track *t*2–2, whereby the two signals cancel each other. Thus, due to the cancellation of the answer signal, only the message signal among the signals reproduced from the second track is sent through the closed right-hand contacts of relay contacts *y*3–2 and *y*3–3 to the amplifier 17 where it is amplified, and then through the closed relay contact *y*3–4 to be applied to a speaker 23. Consequently, only the message from the caller is audibly reproduced by the speaker. It will easily be appreciated that, though in this embodiment the phase-inversion and level adjustment of the answer signal are effected at the time of reproduction of the signals from the tapes, this phase-inversion and level-adjustment can also be easily effected before the recording of the signals. Further, perfect cancellation of the answer signal is not necessary, since only the degree of cancellation sufficient to produce a clear audible reproduction of the message signal by the speaker is necessary.

As described above, the afore-said first and second objects are wholly achieved according to the present invention. In addition, as a first advantage, the conversation time is shortened resulting in a decrease in the conversation fee, especially in case of a long-distance call. As a second advantage, the instant device records the whole message from callers, inclusive of ones who are unfamiliar with the automatic telephone answering device, and permits its owner to determine who is the caller. Thus, the present invention is very effective from a practical point of view.

While the invention has been particularly shown and described with reference to the preferred embodiment thereof, it will be understood by those skilled in the art that various changes in form and details may be made therein without departing from the spirit and scope of the invention.

What is claimed is:

1. In the art of automatic telephone answering devices, the method of permitting an incoming message signal from a caller to be recorded simultaneously with the transmission of a recorded answer signal to the caller, the steps comprising:

a. recording the answer signal,
b. simultaneously; reproducing and transmitting the recorded answer signal to the caller; re-recording on a first recording medium the answer signal transmitted to the caller; and on a second recording medium recording the incoming message signal, and re-recording the answer signal transmitted to the caller to produce a recorded composite signal,
c. reproducing the re-recorded answer signal and the recorded composite signals,
d. inverting the reproduced answer signal,
e. combining the inverted answer signal and the reproduced composite signal so that the answer and inverted answer signals are cancelled out in the resultant signal, and
f. applying the resultant signal to a speaker to audibly reproduce only the incoming message signal.

2. In the art of automatic telephone answering devices, the method of permitting an incoming message signal from a caller to be recorded simultaneously with the transmission of a recorded answer signal to the caller, the steps comprising:

a. recording the answer signal,
b. inverting the recorded answer signal,
c. simultaneously: reproducing and transmitting the recorded answer signal to the caller; recording the inverted answer signal on a first recording medium; and on a second recording medium recording the message signal and re-recording the transmitted answer signal to produce a recorded composite signal;
d. reproducing and combining the recorded inverted answer signal and the recorded composite signal to cancel out the answer and inverted answer signals in the resultant signal, and e. applying the resultant signal to a speaker to audibly reproduce only the incoming message signal.

3. Automatic telephone answering apparatus comprising:

a. terminal means adapted to be connected to a telephone line, b. answering record means storing a recorded answering signal and adapted to be connected to said terminal means, c. recording/reproducing means for simultaneously recording both an incoming message signal applied to said terminal means from said telephone line and also the answering signal reproduced from said answering record means, d. first switch means responsive to a call signal at said terminal means for coupling said answering record means to said terminal means and to said recording/reproducing means, whereby said answering signal is transmitted to said telephone line via said terminal means and also to said recording-/reproducing means simultaneously to be re-recorded on a first and second recording medium, and whereby said incoming message signal is transmitted to said recording/reproducing means to be recorded on one of said recording media to form a composite recorded signal with one of the re-recorded answering signals, e. speaker means, f. phase inverter means for inverting the other of said re-recorded answering signals reproduced from said recording/reproducing means, and g. second switch means for coupling to said speaker means, the inverted answering signal and the composite signal reproduced from said recording/reproducing means, so that the answering signals are cancelled out, whereby only the message signal is reproduced by said speaker means.

4. Automatic telephone answering apparatus as defined in claim 3, wherein said recording/reproducing means comprises a single magnetic tape recorder having two record/reproduce heads and a tape having two corresponding tracks, whereby said answering signal is re-recorded alone on one of said tracks and together with said message signal on the other of said tracks.

5. Automatic telephone answering apparatus as defined in claim 3, further comprising signal level adjuster means for making the level of the inverted answering signal equal to that of the answering signal component of said composite signal.

* * * * *